United States Patent
Dunkin

(10) Patent No.: US 10,228,669 B2
(45) Date of Patent: Mar. 12, 2019

(54) MACHINE TOOL MONITORING

(71) Applicant: Rolls-Royce Corporation, Indianapolis, IN (US)

(72) Inventor: Mike R. Dunkin, Carmel, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 223 days.

(21) Appl. No.: 15/156,384

(22) Filed: May 17, 2016

(65) Prior Publication Data

US 2016/0346890 A1 Dec. 1, 2016

Related U.S. Application Data

(60) Provisional application No. 62/166,903, filed on May 27, 2015.

(51) Int. Cl.
| | |
|---|---|
| *G05B 15/02* | (2006.01) |
| *G05B 19/00* | (2006.01) |
| *G06F 19/00* | (2018.01) |
| *G05B 19/4065* | (2006.01) |
| *B23Q 17/09* | (2006.01) |

(52) U.S. Cl.
CPC ......... *G05B 15/02* (2013.01); *B23Q 17/0966* (2013.01); *G05B 19/4065* (2013.01); *G05B 2219/37234* (2013.01)

(58) Field of Classification Search
CPC ................ G05B 15/02; G05B 19/4065; G05B 2219/37234
See application file for complete search history.

(56) References Cited

U.S. PATENT DOCUMENTS

| | | | |
|---|---|---|---|
| 3,986,010 A * | 10/1976 | Lankford ........... | G05B 19/4163 318/572 |
| 4,211,129 A | 7/1980 | Wittkopp et al. | |
| 4,440,529 A | 4/1984 | Henslee et al. | |
| 4,471,444 A | 9/1984 | Yee et al. | |

(Continued)

OTHER PUBLICATIONS

"Bayesian network," Wikipedia, the free encyclopedia, retrieved from https:I/en.wikipedia.org/wiki/Bayesian_network, Aug. 18, 2015, 15 pp.

(Continued)

*Primary Examiner* — Ronald D Hartman, Jr.
(74) *Attorney, Agent, or Firm* — Shumaker & Sieffert, P. A.

(57) ABSTRACT

A method includes sending, by a computing device, control signals to a machine tool to machine a component located on a platform to form a feature in the component, monitoring, by the computing device, while machining the feature into the component with the machine tool, torque forces of the machine tool against the component caused by the machining of the feature into the component via at least one sensor positioned on the platform, evaluating, by the computing device, while machining the feature into the component with the machine tool, a quality of the machine tool based on the monitored torque forces; and, in response to the evaluation of the quality of the machine tool indicating an undesirable quality of the machine tool, sending, by the computing device, control signals to the machine tool to interrupt the machining of the component and replace a machining element of the machine tool.

21 Claims, 4 Drawing Sheets

(56) References Cited

U.S. PATENT DOCUMENTS

| | | | |
|---|---|---|---|
| 4,509,126 A | 4/1985 | Olig et al. | |
| 4,514,797 A | 4/1985 | Begin | |
| 4,563,897 A | 1/1986 | Moore | |
| 4,579,487 A * | 4/1986 | Lehmkuhl | G05B 19/4065 408/11 |
| 4,644,335 A | 2/1987 | Wen | |
| 4,709,198 A | 11/1987 | Ogo et al. | |
| 4,713,770 A | 12/1987 | Hayes et al. | |
| 4,741,231 A | 5/1988 | Patterson et al. | |
| 4,802,095 A | 1/1989 | Jeppsson | |
| 4,805,351 A | 2/1989 | Dobson et al. | |
| 4,918,616 A | 4/1990 | Yoshimura et al. | |
| 4,992,712 A * | 2/1991 | Fujimoto | G05B 19/186 318/569 |
| 5,001,931 A | 3/1991 | Nishimoto et al. | |
| 5,054,087 A | 10/1991 | Carbon et al. | |
| 5,076,102 A | 12/1991 | Sato et al. | |
| 5,125,188 A | 6/1992 | Ogawa et al. | |
| 5,170,358 A | 12/1992 | Delio | |
| 5,349,337 A * | 9/1994 | McCormick | G05B 19/4166 340/680 |
| 5,432,422 A * | 7/1995 | Nagano | G05B 19/404 318/611 |
| 5,481,483 A | 1/1996 | Ebenstein | |
| 5,517,310 A | 5/1996 | Paquette | |
| 5,663,894 A | 9/1997 | Seth et al. | |
| 5,768,137 A | 6/1998 | Polidoro et al. | |
| 5,816,122 A | 10/1998 | Benning et al. | |
| 5,921,726 A | 7/1999 | Shiozaki et al. | |
| 6,085,121 A | 7/2000 | Stern | |
| 6,161,055 A | 12/2000 | Pryor | |
| 6,241,435 B1 | 6/2001 | Huang et al. | |
| 6,566,835 B1 * | 5/2003 | Yoshida | G05B 19/404 318/569 |
| 6,655,189 B1 | 12/2003 | Smith | |
| 6,697,759 B2 | 2/2004 | Saarinen et al. | |
| 6,873,722 B2 | 3/2005 | Hercke et al. | |
| 6,963,396 B2 | 11/2005 | Kimberlin | |
| 7,016,052 B2 | 3/2006 | Bloch et al. | |
| 7,206,657 B2 | 4/2007 | Esterling | |
| 7,289,873 B2 | 10/2007 | Redecker et al. | |
| 7,333,218 B2 | 2/2008 | Vaidyanathan | |
| 7,369,225 B2 | 5/2008 | Messerschmidt et al. | |
| 7,381,017 B2 | 6/2008 | Wang et al. | |
| 7,388,980 B2 | 6/2008 | Vaidyanathan | |
| 7,437,935 B2 | 10/2008 | Hanna et al. | |
| 7,536,237 B2 | 5/2009 | Esterling | |
| 7,540,697 B2 | 6/2009 | Wang et al. | |
| 7,574,035 B2 | 8/2009 | Koonankeil | |
| 7,602,486 B2 | 10/2009 | McDaniel et al. | |
| 7,602,963 B2 | 10/2009 | Nightingale et al. | |
| 7,619,646 B2 | 11/2009 | Freifeld et al. | |
| 7,706,912 B2 | 4/2010 | Grant et al. | |
| 7,710,287 B2 | 5/2010 | Lange et al. | |
| 7,903,245 B2 | 3/2011 | Miousset et al. | |
| 7,903,865 B2 | 3/2011 | Li et al. | |
| 7,933,679 B1 | 4/2011 | Kulkarni et al. | |
| 7,933,749 B2 | 4/2011 | Chang et al. | |
| 8,005,574 B2 | 8/2011 | Inagaki | |
| 8,014,903 B2 | 9/2011 | Inagaki | |
| 8,049,901 B2 | 11/2011 | Aoki et al. | |
| 8,060,835 B2 | 11/2011 | Newcomer et al. | |
| 8,205,530 B2 | 6/2012 | Subramanian | |
| 8,229,598 B2 | 7/2012 | Suzuki et al. | |
| 8,256,590 B2 | 9/2012 | Suzuki et al. | |
| 8,317,440 B2 | 11/2012 | Roders | |
| 8,351,679 B2 | 1/2013 | Fukami | |
| 8,374,717 B2 | 2/2013 | Suzuki et al. | |
| 8,414,264 B2 | 4/2013 | Bolms et al. | |
| 8,490,526 B2 | 7/2013 | Subramanian | |
| 2002/0002414 A1 | 1/2002 | Hsiung et al. | |
| 2002/0031250 A1 | 3/2002 | Saito et al. | |
| 2004/0068394 A1 * | 4/2004 | Maekawa | B23Q 11/04 702/185 |
| 2005/0116673 A1 * | 6/2005 | Carl | A61B 17/1626 318/432 |
| 2005/0210986 A1 | 9/2005 | Dondi | |
| 2006/0064197 A1 | 3/2006 | Shiga et al. | |
| 2008/0047333 A1 * | 2/2008 | Turrini | G05B 19/4065 73/104 |
| 2008/0063483 A1 * | 3/2008 | Kawai | G05B 19/4015 409/208 |
| 2010/0029179 A1 * | 2/2010 | Cloutier | B23Q 15/225 451/9 |
| 2010/0034609 A1 | 2/2010 | Doppenberg | |
| 2010/0161107 A1 | 6/2010 | Kappmeyer et al. | |
| 2011/0081216 A1 | 4/2011 | Ogura et al. | |
| 2011/0177627 A1 | 7/2011 | Huegli et al. | |
| 2011/0254496 A1 | 10/2011 | Barkman et al. | |
| 2012/0010744 A1 | 1/2012 | Yamashita et al. | |
| 2012/0065766 A1 | 3/2012 | Yoshino et al. | |
| 2012/0101624 A1 | 4/2012 | Ueno | |
| 2012/0109360 A1 | 5/2012 | Nishimura et al. | |
| 2012/0158170 A1 | 6/2012 | Bornemann et al. | |
| 2012/0224048 A1 | 9/2012 | Trzcinski | |
| 2012/0253708 A1 | 10/2012 | Tanaka | |
| 2013/0164092 A1 | 6/2013 | Kondo | |
| 2013/0173046 A1 * | 7/2013 | Kawana | G05B 19/404 700/186 |
| 2013/0208951 A1 | 8/2013 | Salem et al. | |
| 2013/0211574 A1 | 8/2013 | Wang et al. | |
| 2013/0248495 A1 * | 9/2013 | Leao | B23H 1/10 219/69.17 |
| 2013/0253670 A1 * | 9/2013 | Chung | G05B 19/4065 700/79 |
| 2013/0304248 A1 | 11/2013 | Lange et al. | |
| 2013/0345851 A1 | 12/2013 | Kataoka et al. | |
| 2014/0005831 A1 | 1/2014 | Naderer et al. | |
| 2014/0075754 A1 * | 3/2014 | Barron | G05B 19/402 29/888.012 |
| 2014/0216170 A1 * | 8/2014 | Ma | B23Q 17/0966 73/862.06 |
| 2014/0260623 A1 | 9/2014 | Salem et al. | |
| 2015/0145193 A1 * | 5/2015 | Ogawa | B23Q 17/005 269/24 |
| 2015/0328771 A1 * | 11/2015 | Yuelai | B25J 9/1612 414/730 |
| 2016/0069813 A1 | 3/2016 | Ritchey et al. | |
| 2016/0070253 A1 | 3/2016 | Dunkin et al. | |
| 2017/0089684 A1 * | 3/2017 | Grupp | G01B 5/008 |

OTHER PUBLICATIONS

"BlueSwarf How it Works," Retrieved from http://www.theinnovationmachine.com/The%20Learning%20Library/BlueSwarf%20How%20it%20Works.pdf on Sep. 1, 2015, 2 pp.

"What is Chatter," BlueSwarf LLC, retrieved from http://www.blueswarf.com on Aug. 31, 2015, 6 pp.

BlueSwarf, "BlueSwarf DC Kit, Tooling Cloud and Dashboards," Retrieved on Aug. 13, 2015, from http://www.blueswarf.com, 1 pp.

BlueSwarf, "Go Green with Blue," BlueSwarf LLC, retrieved from http://www.blueswarf.com retrieved on Aug. 31, 2015, 1 pp.

Haber et al., "An investigation of tool-wear monitoring in a high-speed machining process," Sensors and Actuators A, vol. 116, 2004, 7 pp. In accordance with MPEP 609.04(a), Applicant points out that the year of publication is sufficiently earlier than the effective U.S. filing date and any foreign priority date so that the particular month of publication is not in issue.

Harper, "Chatter Myths: Pieces of the Puzzle in Maximized Machining," MoldMaking Technology, Posted Sep. 1, 2004, 5 pp.

Harrison et al., "Inspection of White Layer in Hard Turned Components Using Electrochemical Methods," American Society of Mechanical Engineers, Journal of Manufacturing Science and Engineering, vol. 129, No. 2, Apr. 2007, 11 pp.

Jackson, "A User's Guide to Principal Components," Wiley-Interscience Publication, John Wiley & Sons, INC, Jan. 1991, 18pp.

Kalidindi et al., "Microstructure Informatics Using Higher-Order Statistics and Efficient Data-Mining Protocols," Enabling ICME, The Member Journal of the Minerals, Metals & Materials Society,

(56) References Cited

OTHER PUBLICATIONS

Retrieved from http://www.tms.org/pubs/journals/JOM/JOMhome.aspx, vol. 63, No. 4, Apr. 2011, 8 pp.

Kim et al., "Tool life improvement by peck drilling and thrust force monitoring during deep-micro-hole drilling of steel," International Journal of Machine Tools and Manufacture, vol. 49, 2009, 10 pp. In accordance with MPEP 609.04 (a), Applicant points out that the year of publication is sufficiently earlier than the effective U.S filing date and any foreign priority date so that the particular month of publication is not in issue.

Li et al., "Discrete wavelet transform for tool breakage monitoring," International Journal of Machine Tools & Manufacture, vol. 39, Feb. 1999, 10 pp.

Materials Resources LLC, Home of Microstructure Informatics, retrieved from http://www.icmrl.net/ Aug. 18, 2015, 2 pp.

Metal Max, "The Complete Package for Machine-Tool Dynamic Characterization," BlueSwarf LLC, retrieved from http:!/www.blueswarf.com on Aug. 31,2015,2 pp.

Smith, "Machining Dynamics, Using Science to Optimize High Performance Milling in Your Shop," Modern Machines Webinar, BlueSwarf, Jun. 19, 2014, Retrieved from http://www.mmsonline.com/webinars, 1 pp.

TMAC MP, "Tool Monitoring Adaptive Control for Multi-Process Machines," Caron Engineering, Retrieved Jul. 22, 2015 from http://www.caroneng.com, 2 pp.

TMAC SP, "Save Time & Money Reduce Cycle Time Analyze Cutting Problems," Caron Engineering, Retrieved from http://www.caroneng.com on Jul. 22, 2015, 2 pp.

TMAC, "Save Time and Money with Reduced Cycle Time," MT Connect Protocol, Caron Engineering, Retrieved Jul. 22, 2015, from http://www.caroneng.com, 6 pp.

Turk et al., "Eigenfaces for Recognition," Massachusetts Institute of Technology, Journal of Cognitive Neuroscience vol. 3 No. 1, 1991, 17 pp. In accordance with MPEP 609.04(a), Applicant points out that the year of publication is sufficiently earlier than the effective U.S. filing date and any foreign priority date so that the particular month of publication is not in issue.

Zelinski, "A Subscription to Spindle Speeds," Modern Machine Shop, Posted Oct. 18, 2006, 2 pp.

Zelinski, "Dial Down or Dial Up," Blue Swarf Special Edition, Modem Machine Shop, Mar. 2009, 12 pp.

Zelinski, "Find the Right Speed for Chatter-Free Milling," Modem Machine Shop, Mar. 15, 2000, 2 pp.

Zelinski, "High Speed Machining's Origin Moment," Modern Machine Shop, Feb. 17, 2010, 2 pp.

Zelinski, "No Need for Speed," Modem Machine Shop, Mar. 20, 2008, 5 pp.

Zelinski, "Ten Questions About Chatter," Modern Machine Shop, Sep. 9, 2005, 2 pp.

Zelinski, "The Overhang Effect," Modem Machine Shop, Jan. 1, 2003, 5 pp.

CRAC-Chatter Recognition and Control | AcronymAttic, What does CRAC stand for? Retrieved on Apr. 8, 2016 from http://www.acronymattic.com/Chatter-Recognition-and-Control-(CRAC).html, 3 pgs.

MLI Labs Inc., High Performance Machining Specialists, Harmonizer, Retrieved on Apr. 8, 2016 from http://www.mfg-labs.com/live/?page_id=103, 1 pg.

Dr. Johannes Heidenhain, "Technical Information, Dynamic Efficiency-Working Efficiently and with Process Reliability", Sep. 2013, 8 pgs.

TMAC-MP, Tool Monitoring Adaptive Control, Retrieved on Apr. 8, 2016 from https://www.caroneng.com/products/tmac-mp, 6 pgs.

U.S. Appl. No. 15/094,574, filed Apr. 8, 2016 by Mike R. Dunkin.

\* cited by examiner

MACHINE TOOL MONITORING

This application claims the benefit of U.S. Provisional Application No. 62/166,903, filed May 27, 2015, which is incorporated by reference in its entirety.

TECHNICAL FIELD

The disclosure relates to techniques for monitoring a machine tool.

BACKGROUND

During automated machining, tooling wear or breakage can affect the quality of the machined product. For this reason, monitoring machine tooling wear and breakage may be useful to facilitate replacement of machine tooling to maintain desired machined product qualities.

SUMMARY

This disclosure is directed to techniques for monitoring a machine tool. For example, tool breakage and tool wear may be evaluated by monitoring, while machining a feature in a component located on a platform, torque forces and/or thrust forces of the machine tool on the component with a sensor located on the platform. Such monitoring may be particularly useful to evaluate tool breakage and tool wear of micro-tooling.

In one example, this disclosure is directed to a method comprising sending, by a computing device, control signals to a machine tool to machine a component located on a platform to form a feature in the component according to the control signals, monitoring, by the computing device, while machining the feature into the component with the machine tool, torque forces of the machine tool against the component caused by the machining of the feature into the component with the machine tool via at least one sensor positioned on the platform, evaluating, by the computing device, while machining the feature into the component with the machine tool, a quality of the machine tool based on the monitored torque forces; and in response to the evaluation of the quality of the machine tool indicating an undesirable quality of the machine tool, sending, by the computing device, control signals to the machine tool to interrupt the machining of the component and replace a machining element of the machine tool.

In another example, this disclosure is directed to a system comprising a machine tool including a platform, at least one sensor positioned on the platform, and a computing device. The computing device is configured to send control signals to the machine tool for causing the machine tool to machine a component located on the platform to form a feature in the component, monitor torque forces of the machine tool against the component caused by the machining of the feature into the component with the machine tool via the at least one sensor, during the machining of the feature into the component, evaluate a quality of the machine tool based on the monitored torque forces, and in response to the evaluation of the quality of the machine tool indicating an undesirable quality of the machine tool, send control signals to the machine tool to interrupt the machining of the component and replace a machining element of the machine tool.

In a further example, this disclosure is directed to a non-transitory computer-readable data storage medium having instructions stored thereon that, when executed by one or more processors of a computing device, cause the computing device to send control signals to a machine tool for causing the machine tool to machine a component located on a platform to form a feature in the component, monitor torque forces of the machine tool against the component caused by the machining of the feature into the component with the machine tool via at least one sensor, during the machining of the feature into the component, evaluate a quality of the machine tool based on the monitored torque forces, and in response to the evaluation of the quality of the machine tool indicating an undesirable quality of the machine tool, send control signals to the machine tool to interrupt the machining of the component and replace a machining element of the machine tool.

The details of one or more examples of this disclosure are set forth in the accompanying drawings and the description below. Other features, objects, and advantages of this disclosure will be apparent from the description and drawings, and from the claims.

DETAILED DESCRIPTION

With micro-tooling, conventional monitoring of spindle horsepower, spindle torque, and vibrations may be unsuitable to evaluate tool breakage and tool wear. In micro-tooling the resistance of the tooling element, and resulting voltage shifts of the spindle motor, on a component being machined may be too small to facilitate useful evaluations of tool breakage and tool wear. As described below, tool breakage and tool wear may be evaluated by monitoring, while machining a feature in a component located on a platform, torque forces and/or thrust forces of the machine tool on the component with a sensor located on the platform. Such monitoring may be particularly useful to evaluate tool breakage and tool wear of micro-tooling.

Figure 1:
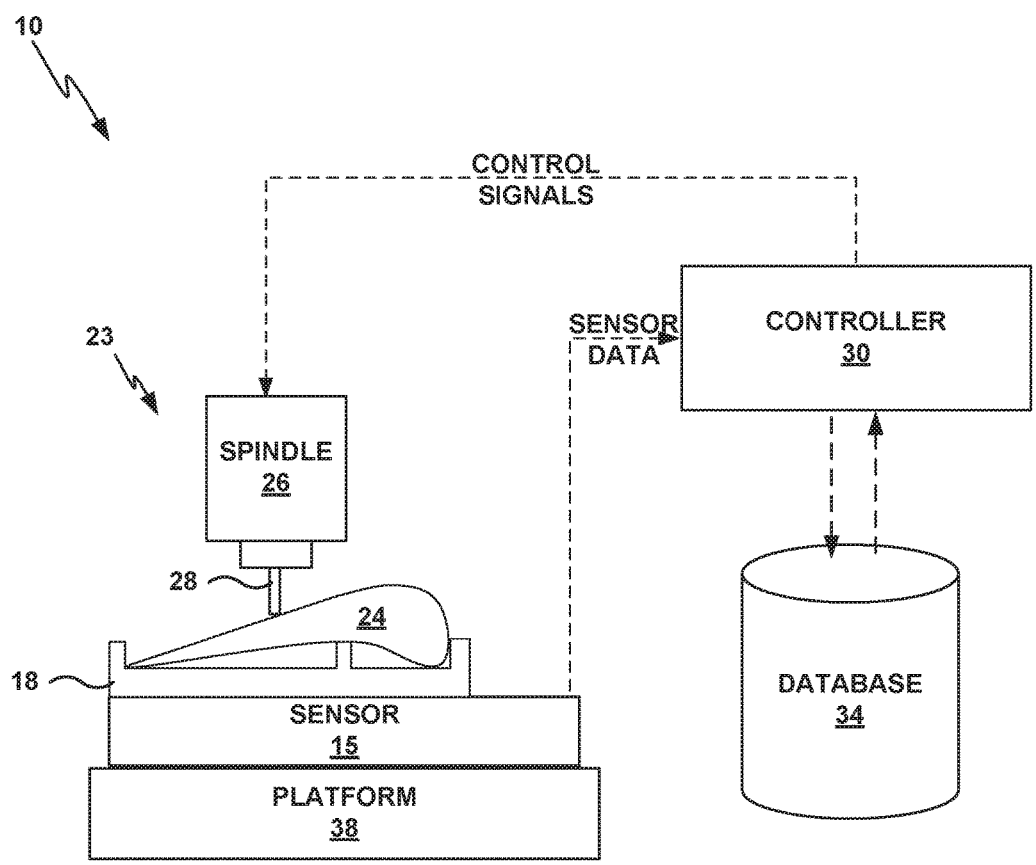
FIG. 1 illustrates a system including a machine tool and a computing device configured to modify a machining parameter while machining with the machine tool based on monitored acoustic signals of the machine tool.

FIG. 1 illustrates system 10, which includes machine tool 23 and machine tool controller 30. Controller 30 is configured to send control signals to machine tool 23 for causing machine tool 23 to machine component 24 to form a feature in component 24. Machine tool 23 is configured to perform a machining operation on component 24 with spindle 26 and machine element 28. In one example, machine tool 23 may represent a computer numerical control (CNC) machine capable of performing routing, turning, drilling, milling, grinding, sanding and/or other machining operations. In various examples, machine tool 23 may include any of a variety of machining equipment, such as, but not limited to, a mill, a drill, a blisk machine, a high speed disk manufacturing device, a grinder, asunder, a lathe, a thin-wall structure manufacturing device, and a blade manufacturing device. In some particular examples, machine element 28 may be a micro-tooling element, such as a drill bit with a diameter of no greater than about 0.01 inches.

Component 24 is mounted to platform 38 in a manner that facilitates precise machining of component 24 by machine tool 23. Work holding fixture 18 secures component 24 to platform 38 and precisely locates component 24 relative to machine tool 23. While the techniques disclosed herein may apply to workpieces of any materials, component 24 may be metal, such as a thin wall metal.

Controller 30 represents a computing device configured to operate machine tool 23. In some examples, controller may be configured to adaptively machine component 24 based on real-time or near real-time feedback of signals associated with the operation of machine tool 23, such as one or more of signals of component 24 via multi-axis sensor 15, machine element 28 vibration, and/or feed and/or rotational forces of machine tool 23. Controller 30 may further be configured to replace machine element 28 based on the signals, such as monitored torque signals and/or thrust force signals sensed by sensor 15 caused by machine element 28 acting on component 24.

Sensor 15 may be a multi-axis force sensor, such as a multi-axis piezoelectric force transducer. In some specific examples, sensor 15 may include a three-axis piezoelectric force transducer. As illustrated in FIG. 1, sensor 15 is positioned between work holding fixture 18 and platform 38. Such monitoring may be particularly useful to evaluate tool breakage and tool wear of micro-tooling.

Controller 30 may monitor signals from sensor 15, such as torque forces from machining element 28 acting on component 24, thrust forces from machining element 28 acting on component 24, or both. In some examples, controller 30 may be configured to continuously monitor, during the machining of the feature into component 24, the torque forces and/or thrust forces produced by the machining of component 24 by machine tool 23. Thrust forces and/or torque forces that exceed predefined maximum thresholds may indicate tooling wear of machining element 28. In addition, thrust forces and/or torque forces that below predefined minimum thresholds may indicate may indicate breakage of machining element 28. Both wear and breakage of machining element 28 are undesirable qualities for machining element 28. In either case, controller 30 may send control signals to machine tool 23 to interrupt the machining of component 24. The interruption of the machining of component 24 may facilitate replacement of machining element 28. In some examples, controller 30 may send control signals to machine tool 23 to have machine tool automatically perform a tooling change including selecting a replacement for machining element 28 before resuming machining of component 24. Thus, qualities of the machining operation of component 24 may be maintained with limited interruption by the wear or breakage of machining element 28.

In some particular examples, controller 30 may include multiple computing devices that combine to provide the functionality of controller 30 as described herein. For example, controller 30 may comprise a CNC controller that issues instructions to spindle 26 and positioning actuators of machine tool 23 as well as a separate computing device that monitors acoustic signals from machine tool 23 and actively adjusts the feed rate, depth and/or rotational speed of spindle 26 based on the monitored signals.

In some examples, such a computing device may represent a general purpose computer running software. Software suitable for actively controlling machining parameters includes Tool Monitor Adaptive Control (TMAC) software from Caron Engineering of Wells, Me., United States. In addition, software suitable for actively monitoring acoustic signals to detect chatter and resonance behavior includes Harmonizer software from BlueSwarf LLC of State College, Pa., United States.

Component 24 may be a thin-walled component. For example, component 24 may be a thin-walled component providing thicknesses of less than about 0.01 inches. In a specific example where component 24 is a thin-walled component, such as a blade airfoil, machining component 24 to form a feature in component 24 may include forming an array of thin film cooling holes in component 24. Machining operations including drilling, such as drilling to form an array of thin film cooling holes include peck drilling in which machining element 28 is repeatedly raised and lowered to provide intermittent contact with component 24 during the drilling of a single hole within component 24.

Figure 2:
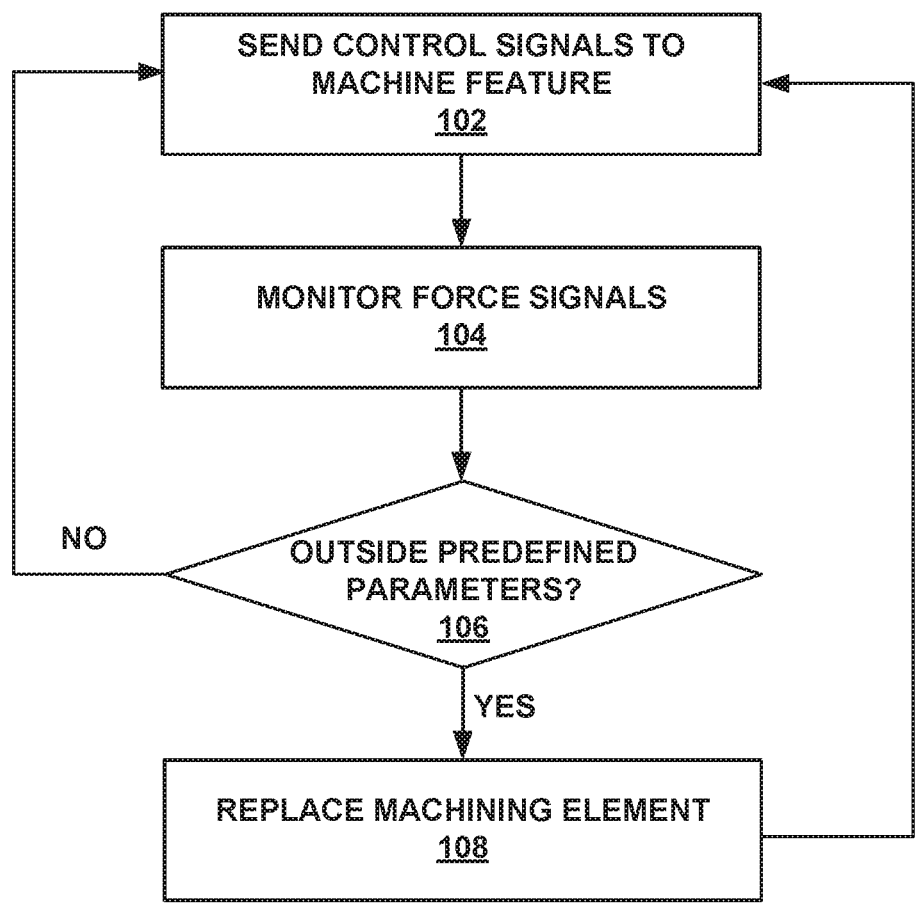
FIG. 2 is a flowchart illustrating example techniques for evaluating, while machining a feature into the component with a machine tool, a quality of the machine tool based on monitored forces.

FIG. 2 is a flowchart illustrating example techniques for evaluating, while machining the feature into the component with a machine tool, a quality of a machine tool based on monitored forces. For clarity, the techniques of FIG. 2 are described with respect to system 10 of FIG. 1, including controller 30.

Controller 30 sends control signals machine tool 23 to machine component 24 to form a feature in component 24 according to the control signals (102). While machining the feature into component 24 with machine tool 23, controller 30 monitors force signals produced by the machining of the component 24 by machine tool 23 via sensor 15 (104).

For example, controller 30 may continuously evaluate the trust and or torque forces imputed on component 24 by machine element 28 to evaluate a quality of machine element 28 (106). Thrust forces and/or torque forces that exceed predefined maximum thresholds may indicate tooling wear of machining element 28. In addition, thrust forces and/or torque forces that below predefined minimum thresholds may indicate breakage of machining element 28. Both wear and breakage of machining element 28 are undesirable qualities for machining element 28.

In the event that thrust forces and/or torque forces are outside predefined thresholds, indicating an undesirable quality of machine tool 23 (e.g., machining element 28), controller 30 may issue control signals to machine tool 23 to interrupt the machining of component 24 and facilitate replacement of machining element 28 (108). In some examples, the control signals may instruct machine tool 23 to automatically perform a tooling replacement of machining element 28. In other examples, a human operator may perform the tooling replacement of machining element 28.

Following the tool replacement, controller 30 continues to send the control signals to machine tool 23 to machine the feature into component 24 (102).

In some examples, controller 30 may store an indication of the monitored forces, such as thrust and or torque forces, of machining operation within database 34. In particular, controller 30 may store an indication of the monitored forces preceding a tooling change to allow later evaluation of the operation of machine tool 23.

In the same or different examples, controller 30 may store an indication of the location of machining operation occurring during the tool replacement within database 34. For example, in the event of a broken drill bit, the location of the broken drill bit may be used to later remove the broken bit from component 24. In some example, removal may include laser drilling or other operation, as drill bits are generally to hard to facilitate removal using mechanical machining operations.

The disclosed techniques for evaluating, while machining a feature into the component with a machine tool, a quality of the machine tool based on monitored forces may provide advantages compared to other monitoring techniques associated with micro-tooling. For example, when machining an array of thin film cooling holes, visual inspection of the cooling holes and/or the machining element is often performed to verify the qualities of the machining. In contrast, the disclosed techniques may allow automatic detection of machine element breakage, which can allow machining to resume quickly after a tooling change. In addition, detection machine element wear may allow a tooling change before machine element breakage. Thus, not only is the need for visual inspection mitigated by the disclosed techniques. Thus, disclosed techniques may reduce the time for producing a component including an array of thin film cooling holes.

In addition, by reducing the frequency of machine element breakage, cycle time to produce machined components may be reduced by reducing the time required to mitigate the breakage, for example, to remove broken pieces of a machining element left behind in the component. In addition, remove broken pieces of the machining element may result in undesirable qualities of the component itself, so reducing the frequency of machine element breakage may also improve the quality of machined components.

Figure 3A:
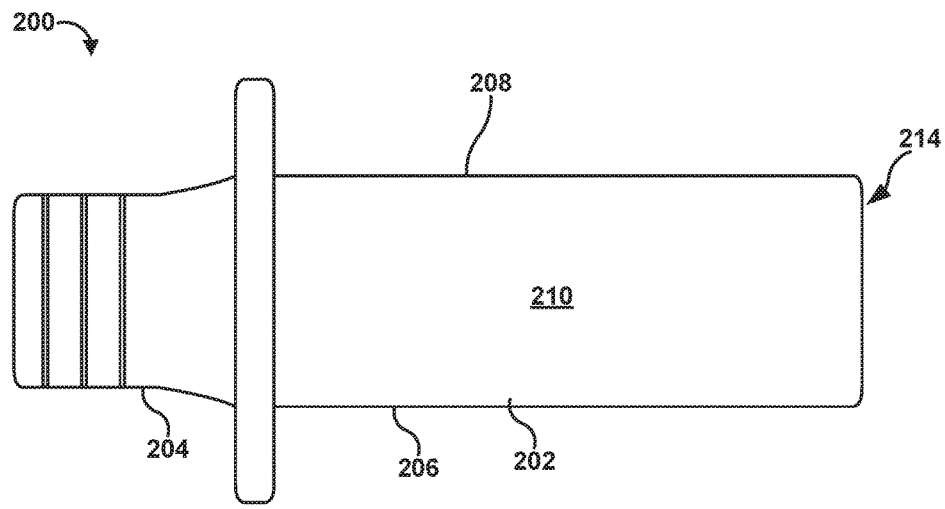
FIGS. 3A-3C are conceptual diagrams of an example blade airfoil configured for use in a gas turbine engine, the airfoil including thin-wall features fabricated as disclosed herein.
Figure 3B:
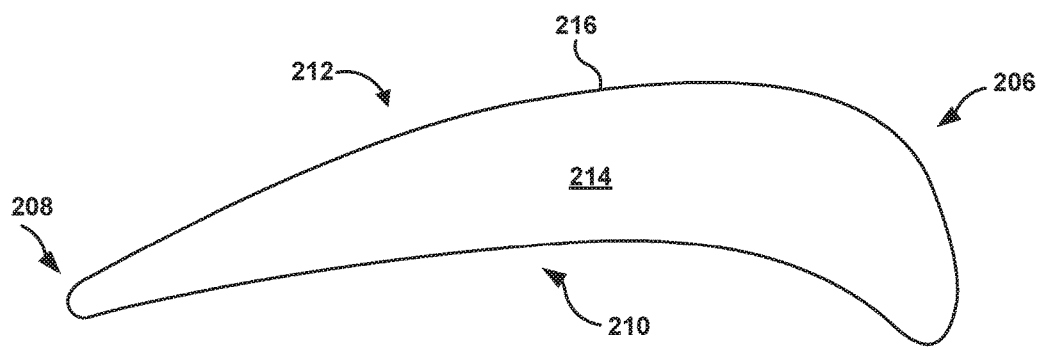
Figure 3C:
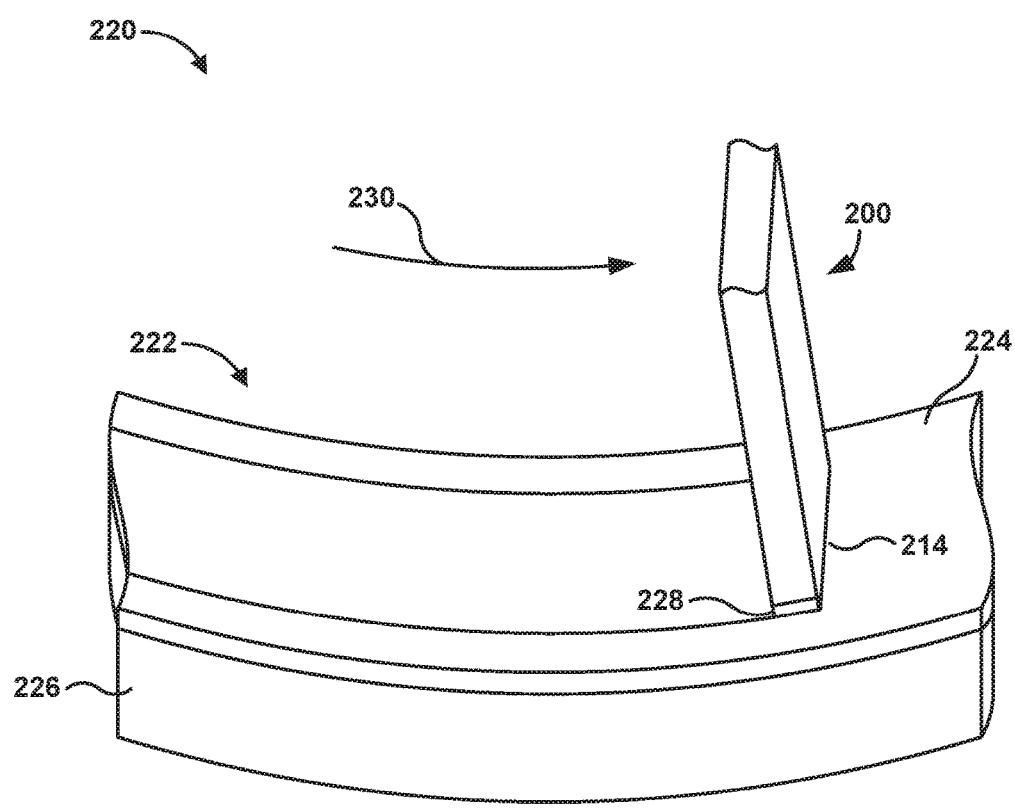

FIGS. 3A-3C illustrate different views of an example blade 200, which represents one example of component 24. Blade 200 generally includes airfoil 202 attached to stalk 204. Airfoil 202 includes a leading edge 206, a trailing edge 208, a pressure sidewall 210, and a suction sidewall 212. Pressure sidewall 210 is connected to suction sidewall 212 at leading edge 206 and trailing edge 208. Further, blade 200 defines blade tip 214, which is a surface substantially orthogonal to leading edge 206. Blade tip 214 is defined by an edge 216 that extends about the perimeter of the surface of blade tip 214, and separates the surface of blade tip 214 from the adjacent surface of airfoil 202. Leading edge 206, trailing edge 208, pressure sidewall 210, and suction side wall 212 generally extend from stalk 204 to edge 216.

In general, blade 200 is a component of a mechanical system including, e.g., a gas turbine engine. In different examples, blade 200 may be a compressor blade that imparts kinetic energy into a fluid or a turbine blade that extracts kinetic energy from a moving fluid. Blade 200 may include an array of thin film cooling holes machined according to the techniques described herein with respect to FIGS. 1 and 2.

FIG. 3C is a conceptual diagram of an example gas turbine engine 220 with blade 200. Gas turbine engine 220 includes blade track or blade shroud 222, which is defined into a surface 224 of a turbine substrate 226. Blade 200 is shown with a tip coating 228 deposited on blade tip 214. Tip coating 228 may combine with thin film cooling to protect blade 200 from extreme temperatures during operation of its mechanical system. Although a single blade 200 is shown in gas turbine engine 220 for ease of description, in actual operation, gas turbine engine 220 may include a plurality of blades.

During operation of gas turbine engine 220, blade 200 rotates relative to blade track 222 in a direction indicated by arrow 230. In general, the power and efficiency of gas turbine engine 220 can be increased by reducing the gap between blade track 222 and blade 200, e.g., to reduce or eliminate gas leakage around blade 200. Thus, gas turbine engine 220, in various examples, is configured to allow blade 200 to abrade into an abradable coating 224 on substrate 226 of blade track 222, which creates a seal between blade track 222 and blade 200. The abrading action may create high thermal and shear stress forces at blade tip 214. In addition, occasional movement of blade tip 214 relative to substrate 226 during the operation of gas turbine engine 222 may cause blade tip 214 to impinge on abradable coating 224, creating high shear forces at blade tip 214.

To protect against the various forces acting on blade 200 and, in particular, blade tip 214, one or more protective layers may be provided on blade 200 and/or blade tip 214. For example, a tip coating 228, may be provided on blade tip 214 to improve different properties of an underlying blade surface including, e.g., wear, corrosion, hardness, and/or temperature resistance properties of an underlying blade surface. Additionally or alternatively, a protective coating may be applied to an entire airfoil 202, including blade tip 214, to improve different properties of an underlying blade surface. In some examples, airfoil 202 may receive a coating that reduces or substantially eliminates the effects of oxidation or corrosion on airfoil 202. Regardless of the specific number or specific type of coatings applied to blade 200, in some examples, blade 200 may benefit from the features and arrays of features, such as an array of thin film cooling holes, described in the disclosure.

An airfoil, such as blade 200, may include additional machined features, which may be machined in conjunction with the fabrication of thin film cooling holes to reduce the cycle time required to for the blade airfoil. For example, machining to produce a blade airfoil, such as blade 200, may include gating removal and/or throat machining at the leading edge of the blade airfoil. As another example, machining to produce a blade airfoil may include hole drilling along the trailing edge of the blade airfoil. As further examples, machining to produce a blade airfoil may also include slash face along fore and aft faces and/or tip cap finishing. Each of these machining processes may be implemented in combination with monitoring torque forces of the machine tool against the blade 200 caused by the machining of the feature into blade 200 with the machine tool via at least one sensor positioned on a platform that holds blade 200 during machining. In addition, more than one feature may potentially be machined simultaneously on blade airfoil to further reduce cycle time.

The techniques described in this disclosure may be implemented, at least in part, in hardware, software, firmware, or any combination thereof. For example, various aspects of the described techniques, including controller 30, may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples of this disclosure have been described. These and other examples are within the scope of the following claims.

What is claimed is:

1. A method comprising:
sending, by a computing device, control signals to a machine tool to machine a component located on a platform to form a feature in the component according to the control signals;
monitoring, by the computing device, while machining the feature into the component with the machine tool, torque forces of the machine tool against the component caused by the machining of the feature into the component with the machine tool via at least one sensor positioned on the platform;
evaluating, by the computing device, while machining the feature into the component with the machine tool, a quality of the machine tool based on the monitored torque forces; and
in response to the evaluation of the quality of the machine tool indicating an undesirable quality of the machine tool, controlling, by the computing device, the machine tool to interrupt the machining of the component and facilitate replacement of a machining element of the machine tool.

2. The method of claim 1, further comprising monitoring, by the computing device, while machining the feature into the component with the machine tool, thrust forces of the machine tool against the component caused by the machining of the feature into the component with the machine tool via the at least one sensor positioned on the platform,
wherein evaluating, by the computing device, the quality of the machine tool is further based on the monitored thrust forces.

3. The method of claim 1, wherein evaluating, by the computing device, the quality of the machine tool based on the monitored torque forces includes determining whether the monitored torque forces exceed a predetermined maximum threshold.

4. The method of claim 3, wherein evaluating, by the computing device, the quality of the machine tool based on the monitored torque forces includes determining whether the monitored torque forces are below a predetermined minimum threshold.

5. The method of claim 1, wherein sending, by the computing device, control signals to the machine tool to machine the component to form the feature in the component according to the control signals comprises sending, by the computing device, control signals to perform peck drilling.

6. The method of claim 1, wherein monitoring the torque forces of the machine tool against the component caused by the machining of the feature into the component with the machine tool includes continuously monitoring, by the computing device, during the machining of the feature into the component, the torque forces produced by the machining of the component by the machine tool.

7. The method of claim 1, wherein the machining element is a drill bit with a diameter of no greater than 0.01 inches.

8. The method of claim 1,
wherein the component is a blade airfoil, and
wherein the feature includes an array of thin film cooling holes.

9. A system comprising:
a machine tool including a platform;
at least one sensor positioned on the platform; and
a computing device, wherein the computing device:
sends control signals to the machine tool that cause the machine tool to machine a component located on the platform to form a feature in the component;
monitors torque forces of the machine tool against the component caused by the machining of the feature into the component with the machine tool via the at least one sensor;
during the machining of the feature into the component, evaluates a quality of the machine tool based on the monitored torque forces; and
in response to the evaluation of the quality of the machine tool indicating an undesirable quality of the machine tool, controls the machine tool to interrupt the machining of the component and facilitate replacement of a machining element of the machine tool.

10. The system of claim 9,
wherein the computing device, while machining the feature into the component with the machine tool, monitors thrust forces of the machine tool against the component caused by the machining of the feature into the component with the machine tool via the at least one sensor positioned on the platform,
wherein the evaluation of the quality of the machine tool is further based on the monitored thrust forces.

11. The system of claim 9, wherein the at least one sensor includes a multi-axis piezoelectric force transducer.

12. The system of claim 9, further comprising a work holding fixture that secures the component to the platform,
wherein the at least one sensor is positioned between the platform and the work holding fixture.

13. The system of claim 9, wherein the control signals to the machine tool that cause the machine tool to form the feature in the component according to the control signals comprise control signals instructing the machine tool to perform peck drilling.

14. The system of claim 9, wherein the machining element is a drill bit with a diameter of no greater than 0.01 inches.

15. The system of claim 9, further comprising the component,
wherein the component is a blade airfoil, and wherein the feature includes an array of thin film cooling holes.

16. A non-transitory computer-readable data storage medium having instructions stored thereon that, when executed by one or more processors of a computing device, cause the computing device to:
send control signals to a machine tool for causing the machine tool to machine a component located on a platform to form a feature in the component;
monitor torque forces of the machine tool against the component caused by the machining of the feature into the component with the machine tool via at least one sensor;
during the machining of the feature into the component, evaluate a quality of the machine tool based on the monitored torque forces; and
in response to the evaluation of the quality of the machine tool indicating an undesirable quality of the machine tool, control the machine tool to interrupt the machining of the component and facilitate replacement of a machining element of the machine tool.

17. The non-transitory computer-readable data storage medium of claim 16, wherein the instructions are further configured to cause the computing device to, while machining the feature into the component with the machine tool, monitor thrust forces of the machine tool against the component caused by the machining of the feature into the component with the machine tool via the at least one sensor positioned on the platform, and
wherein the evaluation of the quality of the machine tool is further based on the monitored thrust forces.

18. The non-transitory computer-readable data storage medium of claim 16, wherein evaluating the quality of the machine tool based on the monitored torque forces includes determining whether the monitored torque forces exceed a predetermined maximum threshold.

19. The non-transitory computer-readable data storage medium of claim 16, wherein the control signals to the machine tool that cause the machine tool to machine the component located on the platform to form the feature in the component comprise control signals to perform peck drilling.

20. The non-transitory computer-readable data storage medium of claim 16, wherein the instructions are further configured to cause the computing device to store an indication of the torque forces of the machine tool on the non-transitory computer-readable data storage medium.

21. The non-transitory computer-readable data storage medium of claim 16, wherein the instructions are further configured to cause the computing device to store an indication of the evaluation of the quality of the machine tool on the non-transitory computer-readable data storage medium.

* * * * *